United States Patent
Habib et al.

(10) Patent No.: US 10,447,762 B2
(45) Date of Patent: Oct. 15, 2019

(54) REMOTE LOCALIZATION PLATFORM

(71) Applicant: Qordoba, Inc., San Francisco, CA (US)

(72) Inventors: May Habib, San Francisco, CA (US); Waseem AlShikh, San Francisco, CA (US)

(73) Assignee: Qordoba, Inc., San Francisco, CA (US)

( * ) Notice: Subject to any disclaimer, the term of this patent is extended or adjusted under 35 U.S.C. 154(b) by 0 days.

(21) Appl. No.: 14/877,872

(22) Filed: Oct. 7, 2015

(65) Prior Publication Data
US 2016/0098261 A1 Apr. 7, 2016

Related U.S. Application Data

(60) Provisional application No. 62/061,085, filed on Oct. 7, 2014.

(51) Int. Cl.
*H04L 29/08* (2006.01)
*G06F 9/451* (2018.01)

(52) U.S. Cl.
CPC .............. *H04L 67/06* (2013.01); *G06F 9/454* (2018.02); *H04L 67/1095* (2013.01)

(58) Field of Classification Search
CPC ...... H04L 67/06; H04L 67/1095; G06F 9/454
See application file for complete search history.

(56) References Cited

U.S. PATENT DOCUMENTS

| | | | | |
|---|---|---|---|---|
| 2004/0148586 A1* | 7/2004 | Gilboa | ................... | G06F 8/38 717/108 |
| 2010/0100866 A1* | 4/2010 | Kamper | ................... | G09B 5/10 717/105 |
| 2011/0214118 A1* | 9/2011 | Antill | .................... | G06F 9/4448 717/174 |
| 2012/0151433 A1* | 6/2012 | Amodio | ................... | G06F 8/38 717/105 |
| 2013/0111460 A1* | 5/2013 | Mohamed | ............. | G06F 9/4448 717/172 |
| 2014/0007048 A1* | 1/2014 | Qureshi | .................. | G06F 21/10 717/110 |
| 2015/0169318 A1* | 6/2015 | Nash | ........................ | G06F 8/34 717/168 |

OTHER PUBLICATIONS

Microsoft, "Graphics Rendering Registry Settings", https://msdn.microsoft.com/en-us/library/aa970912(v=vs.100).aspx, retrieved on Jan. 3, 2017.*

Wikipedia, "Language Localisation", http://en.wikipedia.org/wiki/Language_localization, Internet Archive Feb. 1, 2013.*

* cited by examiner

*Primary Examiner* — S. Sough
*Assistant Examiner* — Timothy P Duncan
(74) *Attorney, Agent, or Firm* — Fenwick & West LLP

(57) ABSTRACT

A remote localization server enables application or website developers to revise and update presentation content for different target localities without having to reprogram an application for each locality. Such presentation content can include, for example, text, images, audio/video, and user interface ("UI") elements. The updated content can then be synchronized (i.e., "pushed") in real-time, in a remote fashion, to apps installed and running on end user devices, allowing app developers to be agile and responsive to the dynamic demands of a growing user base.

19 Claims, 12 Drawing Sheets

REMOTE LOCALIZATION PLATFORM

CROSS REFERENCE TO RELATED APPLICATIONS

This application claims the benefit of U.S. Provisional Application No. 62/061,085, filed Oct. 7, 2014, which is incorporated by reference in its entirety.

FIELD OF THE INVENTION

This disclosure relates generally to localization of application content, and more particularly to a method and system for localizing mobile application content to one or more target localities.

BACKGROUND OF THE INVENTION

Mobile applications, websites, and web-based applications (hereinafter referred to generally as an "app" or "apps") are a global marketplace. For example, an app developed in San Francisco or Tokyo can attain popularity in hundreds of country-level app stores across the globe. However to effectively be used by various marketplaces, which may have different expectations for application interfaces and may have users speaking different languages, an app should be localized for the users in each particular marketplace. App localization is therefore increasingly important.

Localization may include translating the language used in an app to the correct language for a particular geographic locality as well as providing the appropriate content, imagery, user experience, and/or cultural inferences, etc. For example, an app developed to assist parents in finding childcare services in Europe may be translated into versions of English, French and Italian, but may also be customized for content pulled from England, France, and Italy. This may include, among other things, images of local children, content from local nurseries, information on government regulations specific to each location, instructions optimized for other cultural nuances relating to how parents balance their workday with the needs of their children, etc. Straightforward word-for-word translation typically fails to account for these differences.

Currently, localizing native applications is a process that is relatively manual and time consuming. This is particularly true for mobile device applications, such as those executing on iOS and Android systems, HTML mobile apps, Windows Mobile OS, Linux OS, and others. In general, to achieve an appropriate level of customization, a different build (or version) of the app is generated for each locality and language. The associated costs in terms of money and time to market mean that most developers cannot market their apps to a global audience without significant expenditures. And even developers able to afford the cost of localization can find the conventional process both unwieldy and time intensive.

For purposes of explanation, one example of a prior art process for localizing an app is shown in FIG. 1, which depicts a block diagram of an example prior art process for localizing an app. In this process, a developer must plan for localization of the application during development. Every line of code that contains localizable text is placed within special tags for later identification and modification. In the illustrated embodiment, prior art process 100 begins at step 101 where the code strings are localized to the particular target language. The strings are then exported at step 102. Localizing and exporting the localizable strings typically takes 1-2 weeks. Then, the localizable strings are translated (step 103), which can typically range anywhere from 3-6 weeks depending on the selected translation service and other factors. Images, logos and other art may also be localized or replaced using the same or a similar workflow.

After translation, process 100 continues at step 104 where the translated code is imported and tested. This process can take an additional 1-2 weeks to complete. And then the change management process is performed at step 105. Change management refers to the identification and correction of an error or other problem in the translated application. For example, if a development team finds that the Italian users of the app are not generating as much revenue as the English users, for example, and the team is able to trace this problem back to specific language in the Italian version of the app, then the developer may need to update the code. In some cases, updating the code itself may be time-consuming, as the application may need to be resubmitted to a third party for approval to be placed in an app store. In addition, the developer may then send a notification to users asking them to download the updated app once again. This process can take up to a month or more. Moreover, in many cases only a fraction of the target users will take the time to update their application.

SUMMARY

This disclosure describes techniques for localization of an application without changing the application content in the application itself. A remote localization server enables mobile, website, or web-based application developers to revise and update certain presentation content for different target localities without reprogramming the app. Such presentation content can include, for example, text, images, audio/video media content, HTML 5, and user interface ("UI") elements. The presentation content may be modified at the remote localization server to generate localized content for a target locality. The localized content can then be synchronized (i.e., "pushed") in real-time to end user devices running the app, allowing a developer to modify presentation content of an application without significant delay and permitting the application at a client device to be up to date for its localization configuration.

In one embodiment, an online localization server provides content for an application incorporating a localization module within its app code. To provide localization for the app, in one embodiment the localization module in the app analyzes the app code to identify presentation content of the application. This presentation content may be sent to the remote localization server for the localization server to determine localized content for the application. To identify this presentation content, the localization module may analyze content and structural elements of the app and return only the presentation content and any associated properties to the remote localization server over a network connection.

To incorporate the localized content, the localization module receives localized content at the user device from the remote localization server, such as via an application programming interface ("API") and via one or more networks. The localization module scans the current version of the app code running on the user device and compares the received localized content to the current version of the content on the user device. When the versions differ, the localization module applies updates to the presentation content stored on the user device for any localized content that do not match the localized content on the user device.

In addition, in some embodiments the remote localization server includes an interface for developers to localize their app's presentation content visually, giving non-programmers the ability to update and edit various presentation content elements. Saved updates may then be pushed to end user devices running the app.

BRIEF DESCRIPTION OF THE DRAWINGS

For a better understanding of at least certain embodiments, reference will be made to the following detailed description, which is to be read in conjunction with the accompanying drawings, wherein.

DETAILED DESCRIPTION

Figure 1:
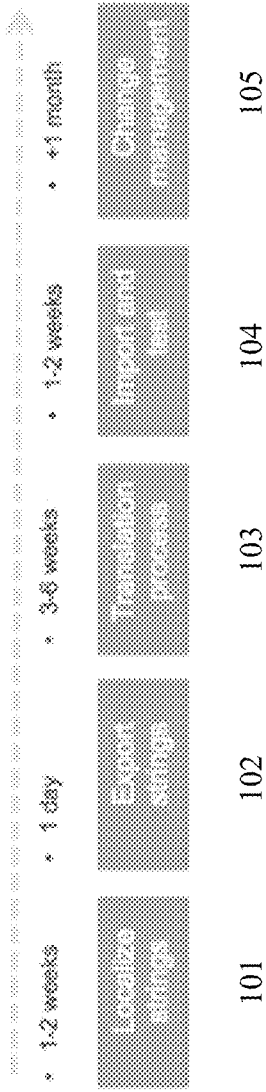
FIG. 1 depicts a block diagram of an example prior art process for localizing an app.

Throughout the description, for the purposes of explanation, numerous specific details are set forth in order to provide a thorough understanding of the present invention. It will be apparent to one skilled in the art, however, that the present invention may be practiced with variations to these details. In some instances, structures and devices are shown in block diagram form to avoid obscuring the underlying principles of the invention.

Overview

A remote localization server enables modification of mobile, web-based applications. Website developers may revise, update, or otherwise modify the presentation content for different target languages or localities without having to reprogram or reengineer an application or resubmit it to a local app store. These revisions, updates, and modifications are termed localized content. Such presentation content can include text, images, audio/video, and other UI elements that are presented to the user. Localized content may then be remotely pushed in real-time to end user devices running the app. In one embodiment, the remote localization server interacts with software, such as a localization module, incorporated into the application code of the app to be modified.

As an example, if a user has a device running an ESPN World Cup Soccer app incorporating a localization module, such as a software development kit (SDK), or other software as described above, the developer can, using the remote localization server, make changes to the content of the ESPN app, for example making the content available in a different language (e.g., Spanish) to the user device. If the particular user's device is in Spanish, the updated content, now in Spanish, can be pushed to the user's device remotely and, in some implementations, the display of the user's device will change to reflect the new Spanish content in real time when the Spanish updates become available from the remote localization server.

This localization of presentation content may be used to update the content of an Internet or cloud-connected mobile app remotely and dynamically as changes are made to the content. In one embodiment, the remote localization server updates a mobile application after it is installed and executing on a user device. In another embodiment, the remote localization server is configured to show changes to presentation content on a user device in real time as changes are made on the remote localization server. This updating may also be used for non-executing content, such as a website or web application content. Developers are continuously uncovering insights into the behavior of their users inside apps. Using the techniques described herein, developers can update the content of applications that are connected to the remote localization server, even after development has been completed and the application has been distributed to many end users.

In some implementations, once localized content is updated using the remote localization platform, the updated content may be pushed to installations of the application on user devices. As a result, there is no need for developers to update the core application code in their respective apps or submit the updated app to any app stores for approval. There is also no need for users to re-download the app, and in some embodiments the localized content is updated without closing the application on the user device. The content may be updated in real time on the user device in a manner transparent to users. The remote localization server controls the content of the app remotely via a localization module added to the application's core functionality. In some embodiments, the localization module can comprise software code with equivalent functionality that can be configured to scan presentation content within an app on a user's device and to re-render localized content thereon. The localization module may be portable (able to function in different apps), and may be implemented as a software development kit (SDK). In other embodiments, a specialized hardware device may also be used, or any combination of specialized hardware and software.

In addition, in some embodiments the remote localization server includes a development interface for app developers to update localized content visually, giving non-programmers the ability to update and edit various localized content elements. The system may further allow developers to view changes being made to the localized content on a selected test user device in real time. In addition, in some configurations, a localization module extracts presentation content from an application and the presentation content is recreated on the remote localization server to enable developers to localize content from the remote localization server.

This localization system has various advantages. In some embodiments, the system provides an intuitive and hassle-free interface for developers to manage app updates visually. Further the system described herein may provide users with the functionality to change, copy, swap, or update presentation content (i.e., text, images, audio/video, or UI elements) of an application without modifying the application's programming. The system can also provide for content updates of apps even after end-users have downloaded the apps to their devices. Updates can be performed remotely and in real-time via the web or other network(s). Finally, in some embodiments, the system is configured for on-demand app translation. This allows app developers to create translated versions of their apps based on the target locality and local user data (i.e., where is the app being downloaded), or other appropriate characteristics.

System Overview

Figure 2:
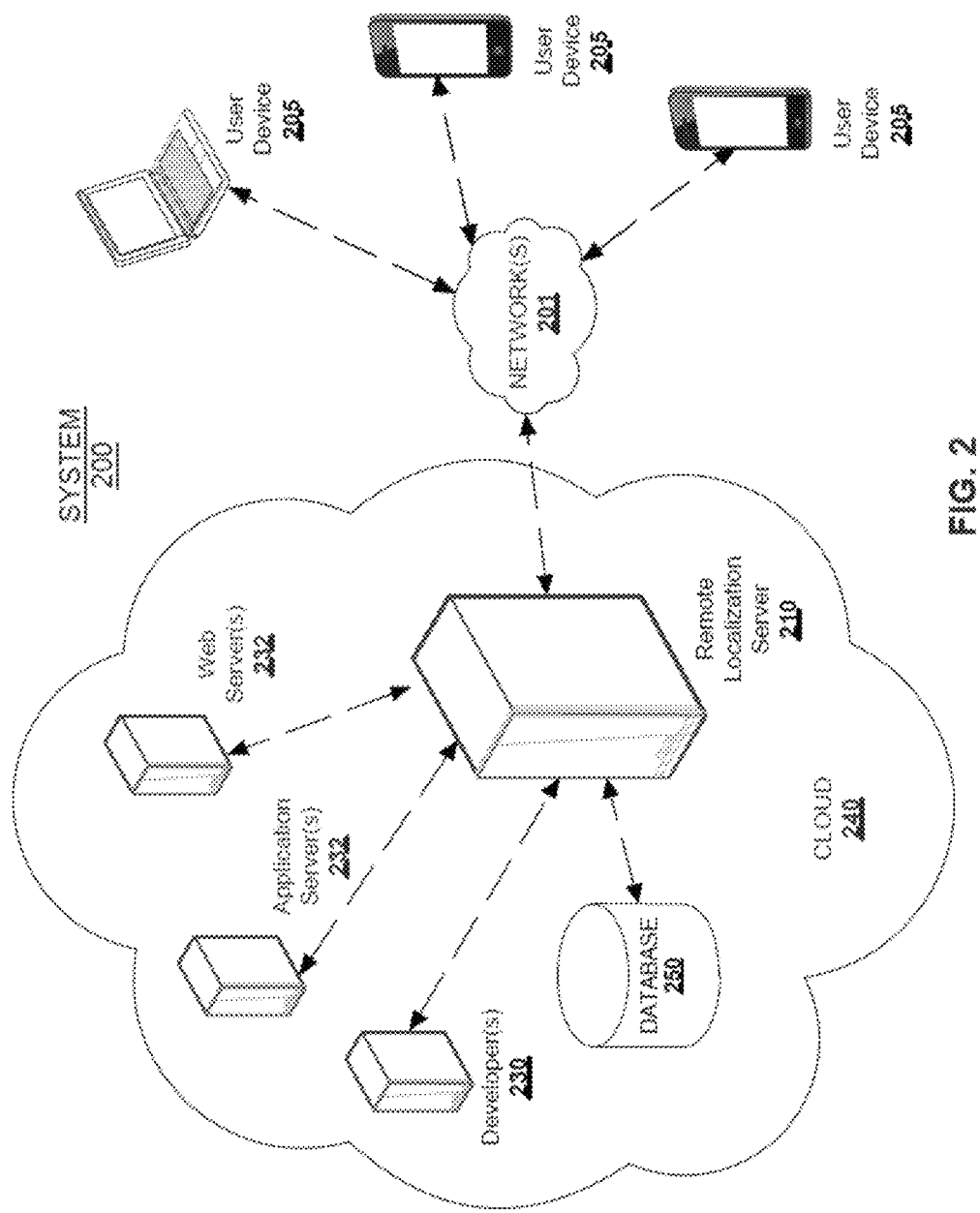
FIG. 2 depicts a block diagram of an example of a system for remote localization of presentation content.

FIG. 2 depicts a block diagram of an example of a system for remote localization of presentation content. As shown in the illustrated embodiment, system 200 includes one or more networks 201 to connect user devices 205 with a remote localization server 210. In the embodiment of FIG. 2, user devices 205 and remote localization server 210 communicate in a client-server relationship. As such, user devices 205 can be configured to communicate with the localization server 210 and to receive updates therefrom via network(s) 201. Such updates may take the form of localized content sent to user devices 205 from remote localization server 210. In certain embodiments this data transfer may take the form of synchronization between user devices 205 and remote localization server 210. Similarly, in the embodiment of FIG. 2, remote localization server 210 is connected to one or more developers 230.

In the embodiment of FIG. 2, remote localization server 210 operates in a cloud-based environment located in an example cloud 240. Cloud computing relates to web-based computing in which groups of remote servers can be networked together to facilitate sharing of data processing tasks across multiple computing resources as well as centralized data storage and online access to such computer services or resources. Any number of web or cloud-based service providers can implement the techniques described herein and such methods are not limited to any particular hardware or software configuration, or to any particular web or cloud-based service provider.

Cloud 240 can be a public or private cloud, or any combination of public and private cloud services. In addition, cloud 240 can be implemented as a local area network ("LAN"), wide-area network ("WAN"), a combination of LANs and WANs, or any other category of communication network(s) as would be appreciated by those skilled in the art. The embodiments described herein can be configured for network access, but no specific network or network architecture should be construed as limiting the embodiments of the invention described herein. Further, as depicted in FIG. 2, remote localization server 210 can be configured to communicate over one or more network(s) 201 with various client user devices 205 as well as with various web or application servers 232 within cloud 240. In other implementations, networks 201 and cloud 240 can be the same network. A direct network connection may also be used instead of a cloud-based implementation to connect the elements described in system 200. The techniques described herein are not limited to any particular network or communication mechanism.

In some embodiments, updates to synchronized data occur in real time. That is, the user device may be updated when an update to localized content is received at the remote localization server 210. In addition, remote localization server 210 can be configured to receive user data, including user feedback and usage statistics data, from the user devices 205. Certain decisions can then be made based on the user data, including deciding which translation/location content to provide to the user.

In some embodiments, app developer(s) 230 connect with remote localization server 210 via one or more interfaces to perform localization operations such updating or revising localized content to target new or different localities and/or languages. In such an arrangement, localization server 210 can act as an intermediate system between various user devices 205 and developers 230 or servers 232. In other embodiments, remote localization server 210 is operable to facilitate localization services for various websites and applications on server(s) 232. An application server 232 may comprise a server storing content accessed by an app or web application in the course of its operation. In some embodiments, an application may access content not stored locally on the user device, but instead stored on a separate application server 232. In these embodiments, remote localization server may be configured to communicate directly with application server 232 for localization purposes. Similarly, a web server 232 may comprise a server storing a website accessed by end-users through HTTP or other means, which contains presentation content that can be similarly accessed and localized by the remote localization server.

As depicted in the illustrated embodiment of FIG. 2, remote localization server 210 is also in communication with one or more databases 250. Database(s) 250 can be locally connected to localization server 210 or can be integrated within server 210. Database(s) 250 can also be in communication with localization server 210 via one or more networks (not shown). Database(s) 250 can be configured to store user information as well as information relating to the various apps associated with the system 200. Database(s) 250 can be configured to store any relevant information required to perform the functionality and techniques described herein and no particular database is required. For instance, past translations, translation recommendations, and past user selections of translation recommendations can be stored in database(s) 250 and accessed by localization server 210 when providing translation services. Various translation matching algorithms can also be stored in database(s) 250 or stored locally within the memory of the remote localization server 210.

Remote Localization for Applications

Provided below is an example system in which the localization of applications may be implemented. Although certain of the elements may be depicted as separate components, in some instances one or more of the components may be combined into a single device or system. Likewise, although certain functionality may be described as being performed by a single element or component within the system, the functionality may, in some instances, be performed by multiple components or elements working together in a functionally coordinated manner. In addition, communications between the various elements described herein may comprise the exchange of data or information using electronic messages on any suitable electronic communication medium as would be well known and appreciated by persons of skill in the art.

Figure 3:
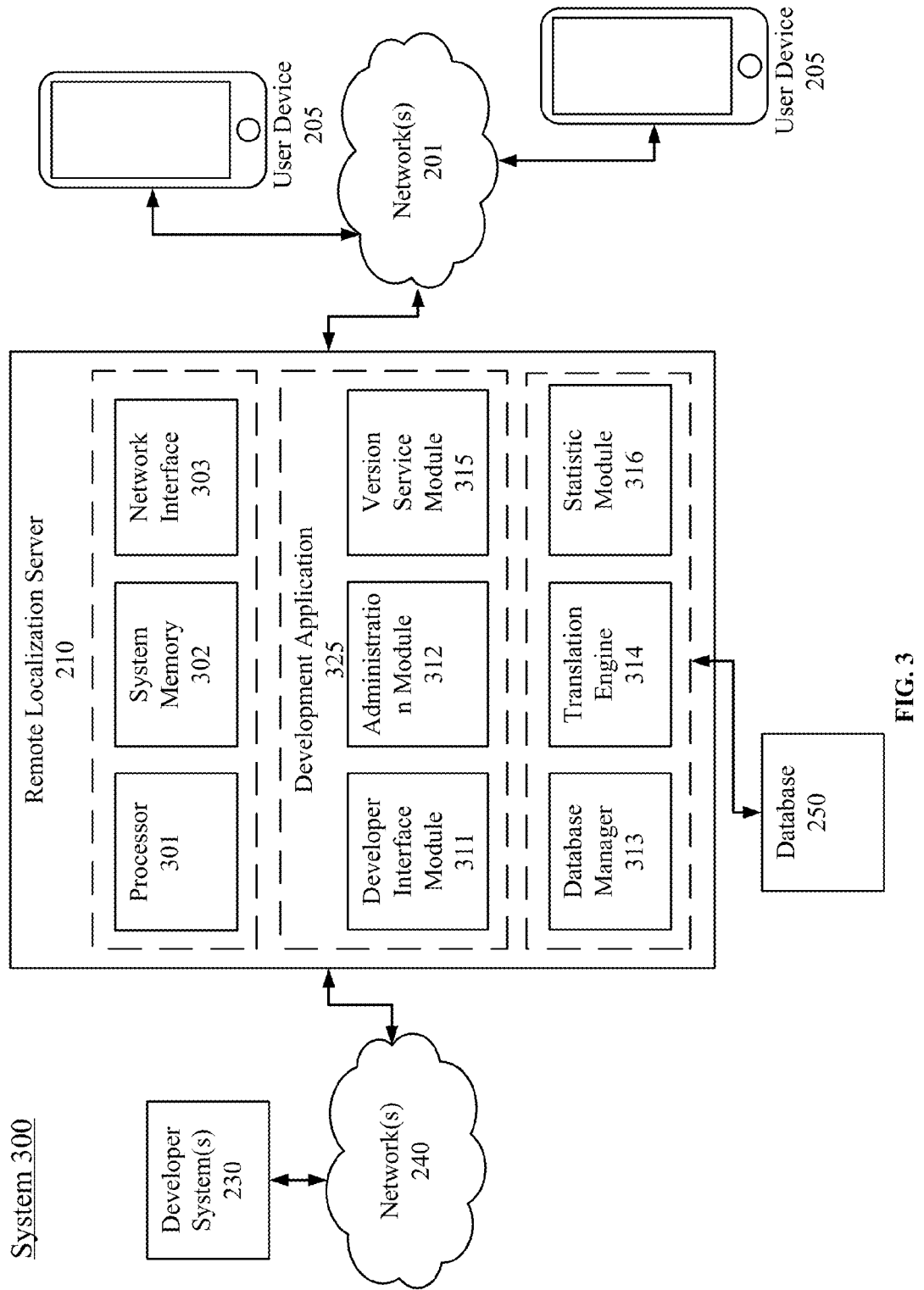
FIG. 3 depicts a block diagram of an example remote localization server.

FIG. 3 depicts a block diagram of an example remote localization server. In the illustrated example, remote localization server 210 includes various hardware and software components, units, and/or modules. However, it should be appreciated that such components, units, or modules are provided for illustration purposes only as each of these units or modules and associated functionality may be provided or performed by one or multiple different components, units or modules.

Further, although FIG. 3 illustrates all of the components, units, or modules located on a single computer server, this disclosure is not intended to be so limited. Multiple components, units, or modules configured on multiple servers can work together in coordination to perform the functions described herein. For instance, multiple server computers may collaborate to provide the functionality of remote localization server 210. In addition, some components, units, or modules may be located on other devices such as additional servers that are functionally coupled with the server 210 components, units, or modules. Moreover, a system for implementing the operations and functions described herein may include additional components, units, or modules, or less components as the case may be. The embodiments described herein are not intended to be limited to any particular hardware or software configuration.

In the illustrated embodiment of FIG. 3, remote localization server 210 is shown as including a processor 301 and system memory 302 (which may comprise any combination of volatile or non-volatile memory such as buffer memory, RAM, DRAM, ROM, flash, or any other suitable memory device(s)).

One or more of the components, units, or modules 311-316 may be disposed within one or more of the components, units, or modules of the system 300, or may be externally located, or any combination of internal and external configurations. As was noted above, the software and hardware modules shown in FIG. 3 are provided for illustration purposes only and are not intended to be limiting as would be appreciated by persons of ordinary skill in the relevant art. Processor 301, system memory 302, and network interface 303 may be used to implement any of these components, units, or modules described below to provide the operations and functions described herein.

Network interface 303 receives and generates electronic messages comprising information transmitted through remote localization server 210 to or from any of the elements shown in FIG. 2. The received information may comprise, for instance, user or app identification information as well as any other information that the remote localization server 210 uses to provide localization of web-based content to users. Network interface unit 303 may transmit and receive information to and from any appropriate unit functionally located within server 210 (e.g., via a system interconnect bus or equivalent circuitry). Network interface 303 may also receive information from one or more of the units, components, or modules within server 210 and may generate one or more electronic messages in an appropriate data format in conformance with a transmission protocol used by remote localization server 210 so that the message may be sent appropriately within the server 210. The electronic message(s) may then be passed onto the network interface 303 for transmission as the case may be.

In the embodiment of FIG. 3, remote localization server 210 is in communication with various user devices 205 over one or more networks 201. Remote localization server 210 is also in communication with various developer system(s) 230 over one or more networks 240. As discussed previously, network(s) 210 and 240 may be the same or different networks, or any combination of suitable communication networks. In addition, localization server 210 may perform some or all of the relevant functions and operations described herein with reference to networks 201 and 240 through use of any suitable combination of software instructions and hardware configurations.

In the implementation of FIG. 3, remote localization server 210 includes a development application 325. In some embodiments, development application 325 receives presentation content from a user device 205, facilitates modification of the presentation content by developers 230, stores any localized content, and selectively publishes localized content to specific sets or subsets of user devices 205. To accomplish this, in certain configurations, the development application 325 includes a developer interface module 311, administration module 312, and version service module 315.

In some embodiments, the developer interface module 311 of the development application 325 provides a developer 230 one or more interfaces (not shown) allowing the developer to interact with remote localization server 210. In the embodiment of FIG. 3, such interactions can comprise receiving, editing, translating, adding, or otherwise modifying presentation content to generate localized content, sending localized content to user devices 205, or any other suitable interaction. In some implementations, interfaces provided by developer interface module 311 take the form of a graphical web application, but interfaces may also be offline, application based, or of any other suitable type. These developer interfaces may enable developer 230 to communicate with the remote localization server 210 directly, or the communication may occur over cloud network 240 or another suitable network. In some configurations developer 230 updates and controls distribution of their localized content through interfaces provided by developer interface module 311.

In the embodiment of FIG. 3, administration module 312 of the development application 325 manages localized content and communicates with user devices 205, and developers 230. In some embodiments, administration module 312 handles developer accounts and registration, associates apps with developers, manages translations/other content updates, and interfaces with user devices 205. Administration module 312 may also maintain a representation of the app as it is run on user devices 205, and, in some embodiments, uses this representation to edit the presentation content.

In some configurations presentation content may be divided into content elements, each element associated with a set of properties such as position, color, font, or any other suitable property. For example, the element of a button may contain properties such as the location of the button, the text of a label, font data of the label, and any other suitable information, or the element of a text string may contain properties such as the plaintext version of the string, the font, the location, formatting information, and the color of the string. Elements may be further grouped with other elements or other appropriate data based on any suitable factors, such as by concurrent display on user device 205, for example grouping elements into "screens" which comprise all elements that might be viewed at a specific point when using the app, by topic, by date created, or by any other suitable factor. In certain embodiments, content elements recognized by the system may be limited to a specific type or types of elements, such as text and images only, or only elements viewable on a specific screen of the app.

In some implementations, the representation is not a functioning version of the app, but a visual representation of the presentation content (or as already modified as localized content) of the app, while in some cases the representation is presented as it would be in a functioning version of the app. In these embodiments, such content may comprise text, graphics, UI elements, or other suitable content. Changes made to the representation of the app may then be reflected as localized content to update content in fully functioning apps on user devices 205. Administration module 312 may interface with a user device 205 for the purposes of receiving presentation content to construct a representation of the app, or to transmit edited content for display on the user device 205. These representations are further discussed further below.

In some embodiments, a developer 230 is associated with a specific app 410 that the developer has permission to modify, to allow developer 230 to edit the presentation content. The developer association can be activated as soon as a user of the system registers the app. Once this occurs, a developer can be registered with system 300 via an account. A set of authorization keys can then be generated by the development application and entered into the developer's environment. In these embodiments, the set of keys identifies the developer and confirms that he or she is the owner of the code being registered. Particular functions, such as editing or viewing content of a particular app may be tied to possession of correct authentication keys.

The version service module 315 may be configured to selectively provide localized content to user devices 205, in some embodiments, based on instructions/permissions set by administration module 312. In the embodiment of FIG. 3, localized content stored on remote localization server 210 (or in an associated database) is separated into distinct content versions managed by the version service module 315. In this embodiment creating a version of an app entails bundling certain localized content together and assigning the bundled content a unique version identifier. Versions may include a copy of all content of the app, a set of modified elements for the localized content, or in some cases a list of recreate-able changes made to the presentation content to generate the localized content. In the case of a recreate-able list of changes, to apply the new content, a localization module on the user device may perform the provided list of changes on the copy of the content local to the user device 205. In some embodiments, there are different versions for each language or locality being targeted, each version containing particular localized content. In these embodiments, the app loaded on any of the user devices 205 can be provided with a specific localized version based on various factors discussed below.

The version service module 315 may provide a version, including the bundled localized content, to a user device 205, allowing the user device 205 to apply the localized content to the application. In some implementations, versions may be associated with other information, such as a status identifier, release date, intended user characteristics, or any other suitable information. This associated information may be used as a targeting mechanism to allow version service module 315 to better select which content version to provide to a given user device 205. A status identifier may indicate the release status of the version. For example, a status identifier of "in testing" may indicate to version service module 315 not to provide the version to a wide array of user devices 205, but instead only to a few devices marked as test devices, or even to only one user device 205, being used by the developer 230 to view changes as content is updated. A release date may indicate to versions service module 315 when to start providing the updated content to user devices 205, and intended user characteristics may be used to determine which user devices 205 the version will be provided to. Examples of intended user characteristics may include user devices 205 in a specific geographic location or area, e.g. to user devices in France, user devices 205 with a specific phone setting, e.g. user devices with Chinese language, or any other suitable identifying information or set of identifying information about user device 205. Version service module 315 may also save the current state of each app version being tracked via the system. Version service module 315 may also be configured to interact with user devices 205 and to send the updated localized content to every appropriate connected user device 205 based on targeting mechanisms, such as a user characteristic.

As previously discussed, remote localization server 210 can include or communicate with one or more databases 250. The database(s) 250 shown in this example may comprise more than one database located in the same or different locations as discussed above. In the embodiment of FIG. 3, remote localization server 210 further includes a database manager 313 that retrieves and manages information from the one or more databases 250. Specifically, database manager 313 may receive requests from one or more of the components, units, or modules of the remote localization server 210 for information that may be stored in one or more of the databases 250. The database manager 313 may then determine and query an appropriate memory location of the database(s) 250 to retrieve the requested information. This information may then be stored in the appropriate location in the database(s) 250 using any suitable storage mechanism and provided to the remote localization server 210 as needed.

In the illustrated embodiment of FIG. 3, localization server 210 may further include a translation engine 314 configured to perform the translation of presentation content. Developer(s) 230 can remotely access the translation engine 314 for translation services to facilitate localization of presentation content via the developer interfaces provided by the developer interface 311. The translation engine 314 can also provide developers 230 with suggested translations of app elements including recommended translations of text, images, audio/video content, and UI elements for a particular selected language and/or locality. Presentation content registered with the system can be processed by the translation engine 314 and suggested translations can be provided to one or more selected languages and/or localities. Developers can review these suggested translations and update the localized content accordingly to target specific countries/localities or languages.

In one embodiment, such localization can be provided initially as a machine translation, and can then be finalized by a human translator. In other embodiments, the translations provided by translation engine 314 can be either completely machine generated, completely human translated, or translated by any suitable method or combination of methods as the case may be. The intelligence for translating presentation content can be learned by the remote localization server 210 over time based upon various computer-learning algorithms as well as based upon past translations of the same or similar presentation content.

In some embodiments, the translation engine 314 can additionally take context into account in providing translation recommendations. The system can present recommendations to users based on one or more matching algorithms whereby users are provided with a listing of best match recommendations for each translation. Such matching recommendations can be presented to users based on a determination of the quality of the match. For instance, in one embodiment, top matches can be displayed to users and listed in priority order based on a percentage of the match as determined by the system based on the matching algorithms.

Human translators can then choose the best recommendation presented, or can customize the translation without machine assistance, or any combination thereof.

In addition, remote localization server 210 also includes a statistic module 316. The statistic module 316 analyzes user website or web-based app usage statistics, feedback, and traffic for each app registered with the system and for each language/locality, and provides alerts and recommendations based on the usage statistics. For example, if the statistic module 316 determines that a particular language or locality has lower than expected user utilization levels, the statistic module 316 can flag that issue for follow-up by developers. Developers 230 can then use this information to edit or refine their localized content on the system to better address the users of that localized content. Statistics module 316 may additionally be configured to communicate with developer application 325 to send and receive user account data. In some embodiments, statistic module 316 monitors the traffic of end users of apps registered with the remote localization server 210. In one implementation, statistic module 316 stores an identifying token on each user device and tracks or associates each token with user data available on the device. In some embodiments, version service module 315 also sends traffic information to the statistic module 316. Such information may include a notification when a new device 205 downloads the registered app or information relating to tracking which elements within the app are viewed by the end user.

Figure 4:
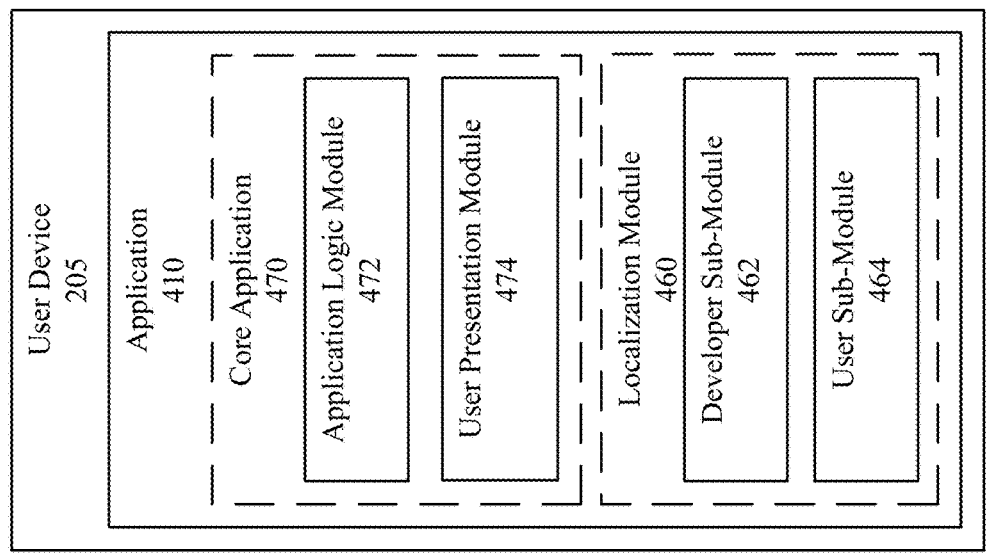
FIG. 4 depicts a block diagram of an example user device and localization module.

FIG. 4 depicts a block diagram of an example embodiment of a user device 205 and a localization module. The remote localization server 210 (including development application 325) may be in communication with user device 205 via an application programming interface (API). In the illustrated embodiment, user device 205 has installed application 410, which includes presentation content eligible to be localized through the remote localization system. Application 410 may include a core application 470, which includes logic and functionality for the application's normal use and other functionality not relating to localization, and a localization module 460, which localizes presentation content of the core application 470. For example, for an application relating to local food reviews, the programming and functionality relating to the local food reviews in the normal functioning of the review application is provided by the core application 470. Similarly, the localization module 460 may modify presentation content of the core application 470 with localized content received from the remote localization server 210.

The core application 470 conceptually includes an application logic module 472 and a user presentation module 474. In the illustrated embodiment, user presentation module 474 provides elements for presentation to the user that may be localized for user interaction. Correspondingly, in this example, application logic module 472 stores code defining the core functionality of the app, but which may describe the underlying functionality of the application which is not localized. The application logic module 472, for example, may describe interactions with an operating system of the user device, calculations for performance of the application's functions, and so forth. In many configurations, the core application 470 may not formally designate separate modules for the application logic module 472 and the user presentation module 474.

The application 410 also includes localization module 460 for providing localization of the application 410 and particularly the features of the core application 470. In this configuration, the localization module 460 is a software package that communicates with remote localization server 210 and updates the user presentation module 474 to modify the presentation of the application 410 to the user.

Localized content on user device 205 may be updated via the localization module 460 associated with application 410 on the user device 205. In some embodiments, the localization module 460 communicates with the remote localization server 210 via an API, which is a specific network service or group of network services used to facilitate communication between remote localization server 210 and user device 205 over network 201. The API may define certain formatting for sending data between server 210 and device 205, for example, defining a format and procedure for sending updated content to device 205, or a format and procedure for pushing updated content to many user devices 205.

When the localization module 460 is a SDK, the SDK is added to the software libraries of an app under development in a specific development environment (such as an "xCode" development environment for iOS applications). The finished application can then be distributed to end users with the SDK included. For example, once the app is ready for distribution, the finalized development version, including the SDK, can be submitted to an appropriate app store for review. When approved by the app store, this version of the app can be installed on any user device 205 by an end user downloading the app from the app store. Thus, as long as the SDK is installed in the original version of the app submitted to the app store, the SDK will be distributed within the app to all end users who download that version. In addition, in the example in which the localization module 460 is an SDK, the same localization module 460 may be used by many different applications 410.

In the embodiment of FIG. 4, localization module 460 is a software package included with the app to be localized. In this embodiment, localization module 460 provides updates to presentation module 474 and provides presentation content and, in some configurations, current localized content to the server side systems of development application 325. The localization module 460 may receive updates to the presentation content at the user devices from the remote localization server 120. The localization module may also scan and transmit to the remote localization server 120 the current version of the application 410 running on the user device and collect relevant data about the user device to receive appropriate localized content. The localization module may also compare a localized content version with the current version of localized content on the user devices, and apply localized content to the application.

In some embodiments, the localization module contains a set of libraries configured to read and communicate information from the application 410 to the remote localization server 210, and receive and apply corresponding updates to the application in return. These functions may include: (1) parsing data structures from the development application 325 on remote localization server 210 for UI information and mapping them to local (on-app) data on user device 205, (2) performing all local saving and loading operations for data versions and resources on user device 205, (3) performing checks for all new updates and sending scheduled requests for synchronizations to remote localization server 210, (4) tracking all activities within the app to determine any updates to content that should be rendered at any given time, and (5) handling offline cases using locally cached localized content, or any other implementation of the features outlined previously. These functions are further described below. These libraries may be grouped as a closed framework installed within application 410 in the localization module 460, such as in a single SDK.

To update the application, the localization module 460 retrieves and applies a relevant version of the localized content, or updates may be delivered to a user device 205 continuously, so that the state of the content of application 410 on the selected device 205 is representative of the current state of the localized content as it is being edited in development application 325, even as the app is open on user device 205. In some embodiments, an update may be applied to the presentation of the content without closing or stopping execution of the app on the user device 205.

In some embodiments, remote localization server 210 synchronizes with localization module 460 installed in the app on user device 205 to localize content stored in user presentation module 474 of app 410. The remote localization server 210 may re-render a representation of this content in development application 325. The presentation content of app 410 stored on the user device 205 may be accessed (or "crawled") by on the app by localization module 460.

In some embodiments, presentation content comprises content "elements," as discussed above, and modifications to localize the content may comprise modifying one or more properties of an element. Localization module 460 can scan the user presentation module 474 for presentation content of the application. The presentation content includes elements displayed to the user for application 410. These elements may consist of a content item or UI element, its associated properties, and any other suitable associated information. In one embodiment each element is scanned for different categories of associated information such as type (i.e., menu item, button, etc.), content (e.g., "Submit," Times New Roman font, 14 pt, gray), location (e.g. coordinates), layout (the element is on the home screen, log out screen, etc.), associated elements (e.g. the element is in a group with this set of other elements, the element is visible with this set of other elements), visual appearance, or any other suitable information. The presentation content can be sent from localization module 460 to development application 325. In some embodiments, sending an element comprises sending the associated pieces of information and properties. In one implementation, this information is encoded and sent as data packages over an API, but any other suitable information transfer system can be used. In this implementation, the data is then stored by the development application 325 and passed to the development interface module 311 of the application. In one embodiment, the data packages may be in JSON programming language which is then processed in JavaScript to convert the JSON content into HTML, HTML 5, CSS, and images for display to a developer for localization. The application interface is thus recreated visually to the developer in the development application 325 and this representation of the application may then be edited in development application 325. In certain configurations, updated presentation content or content elements may also be sent from development application 325 to localization module 460. This process may be similar to the process outlined above, and received data packages may be parsed into structures utilized by app 410. This parsed data can then be used to update presentation content in the core application. In some embodiments, presentation elements may be assigned separate segment numbers or other appropriate identifiers to facilitate these techniques.

As appreciated by persons of skill in the art "JSON" or JavaScript Object Notation refers to an open standard format that uses human-readable text to transmit data objects consisting of attribute-value pairs. It is used primarily to transmit data between a server and web application, as an alternative to XML. Although originally derived from the JavaScript scripting language, JSON is a language-independent data format. Code for parsing and generating JSON data is readily available in a large variety of programming languages.

Further, as discussed above, content or content items may be associated with a group or a "screen." Content elements may be grouped in any appropriate manner, but, in some embodiments, these groupings correspond to screens visible at one time on user device 205. For example, the "login screen" group may comprise all content elements visible at one time when viewing the login screen of app 410. Additionally, in some embodiments, content elements may be grouped into more than one screen at a time. Localization module 460 may additionally associate different screens or groups of content elements together, according to some configurations. In one embodiment screens are linked with other screens from which the user can navigate from a given screen, forming a linked graph of navigation connections between all the screens of app 410.

In some embodiments, the mobile localization module 460 includes two sub-modules, a developer sub-module 462 and a user sub-module 464. Developer sub-module 462 may be configured to scan the local presentation content and transmit to remote localization server 210 the scanned content or content elements as well as any information about the relationships between content elements, relationships between screens, associations between content elements and screens, or other suitable information. Additionally, developer sub-module 462 may be configured to handle updated content using a live update or real-time update model, for example, a configuration in which changes to content made on remote localization server 210 are immediately transmitted and updated on connected user device 205 with developer sub-module 462 active. Developer sub-module 462 may also, in some implementations, allow developers to flag on user device 205 only certain content to be uploaded or changed using the remote localization system. In one embodiment, an additional interface element, such as a button, is displayed within app 410 when developer sub-module 462 is active, allowing developers to select content or content elements for later upload to remote localization server 210 for later localization. In some embodiments activating developer module 462 requires certain authentication keys or credentials to be present on the user device.

In some configurations, user sub-module 464 operates on a version update model, in which updates are selectively pushed to user devices 205 at distinct time intervals. This process might be initiated by server 210 and updates to user devices 205 may occur in real time when the update is marked as available, or, in other configurations, localization module 460 with active user sub-module 464 may request updates from remote localization server 210 at certain scheduled times or time intervals, for example, updated content may be requested every 10 minutes. In other embodiments, updates may be requested selectively or based on the activity of application 410, for example requesting an update only for presentation content being loaded for display to the user, e.g. when the user opens a new screen of app 410. In some configurations only one of the localization module sub-modules is active at a time on any given device 205. For example, a certain set of user devices 205 may have the developer sub-module 462 active, and another set of user devices 205 may have user sub-module 464 active. Sub-module activation may be controlled by an authorization key in applicable configurations, or by any other suitable method, e.g. end-user chosen setting, or by default when app 410 is installed. In other embodiments, both localization module sub-modules may be active at once, or alternatively, only one sub-module may be included on any one device 205.

In one embodiment, developer sub-module 462 is active only on certain user devices 205 being used for testing purposes, for example, by app developers viewing changes made to the app using development application 325. In some embodiments, the testing user device 205 may be physically connected via a direct connection, such as by a universal serial bus (USB) cable, to developer system 230. In other configurations, developer system 230 is adapted to host the development environment being used for testing the app, i.e. the user device 205 used for testing may be emulated on developer system 230. User sub-module 464, in some configurations, is the active module within localization modules installed in apps not currently being used for testing, i.e. user sub-module 464 is the operational sub-module on user devices 205 who have downloaded the app from the app store. In certain configurations, localization module 460 may determine which module or functionality to activate by detecting if associated app 410 is a development app or release ("live") app. In some implementations localization module 460 may make this determination using an authorization key provided within app 410, or provided to app 410 by remote localization server 210. In other implementations, localization module 460 may make this determination using a version number associated with app 410, or by any other suitable method.

Figure 5:
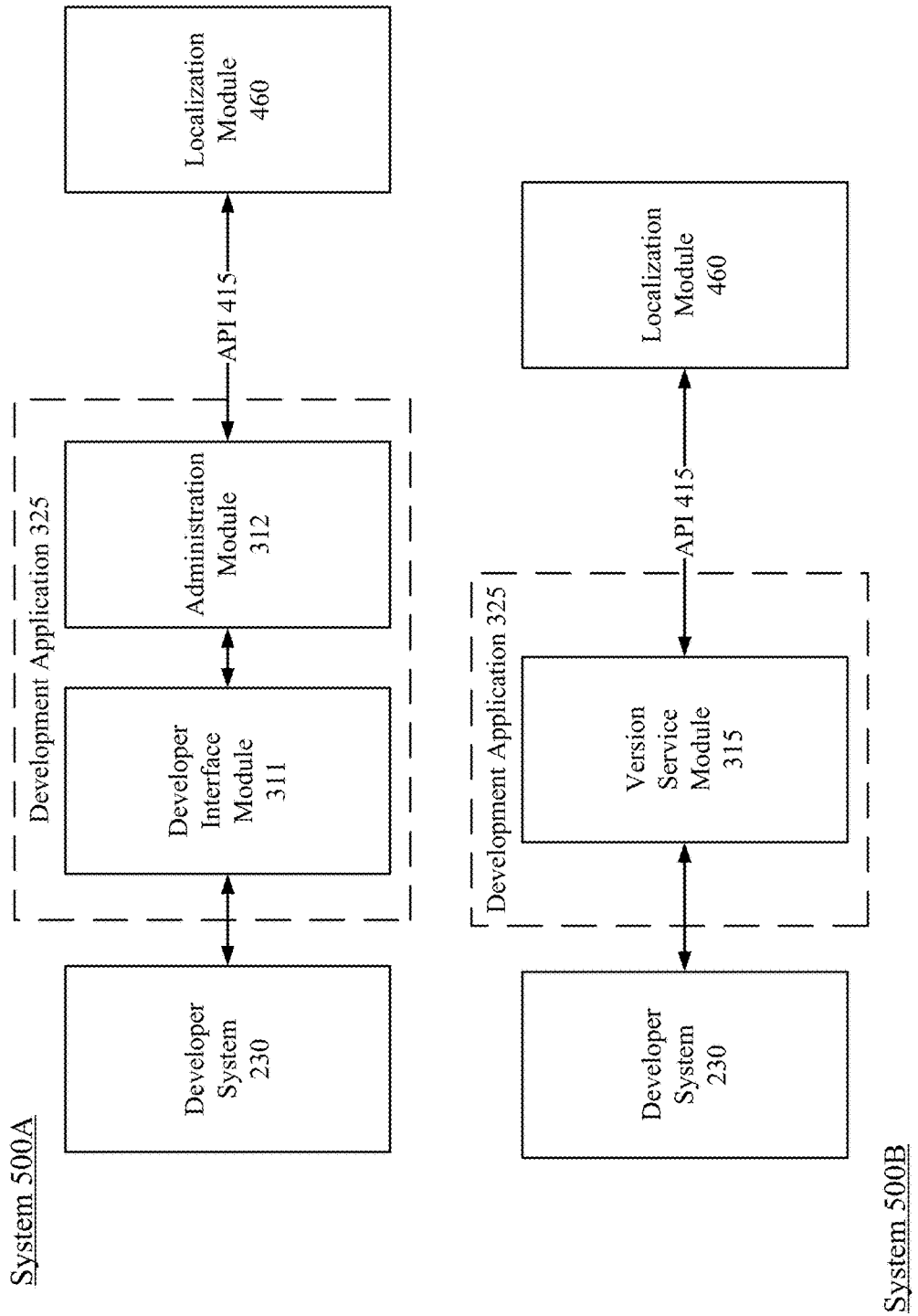
FIG. 5 depicts several conceptual models of an example remote localization platform.

FIG. 5 depicts several conceptual models of an example remote localization server. As discussed above, developer systems 230 can be adapted to communicate with the developer application 325 via one or more developer interfaces (shown and discussed below) provided by the developer interface module 311. Further, development application 325 may also be adapted to facilitate communicating app updates with localization module 460 on user devices 250 via one or more APIs 415 and to receive presentation content, user feedback, and usages statistics from the localization module 460 in return. In system 500A, localization module 460 is in communication with administration module 312 of the development application 325 via API 415; this is an example embodiment of a live update scenario in which application 410 is updated by localization module 460 in real-time as changes are made in development application 325. In some embodiments, real-time updates are provided by opening a websocket between the remote localization server 210 and the user device 205. This permits a constant connection and dynamic visual updates to the application.

In some embodiments, the performance of the connection between user device 205 and remote localization server 210 is important, consequently, in these embodiments, a websocket may be implemented to facilitate communication between the development application 325 and the localization module 460 over API 415. A "WebSocket" is a protocol that can provide full-duplex communications channels over a single TCP connection. A websocket can be designed to be implemented in web browsers and web servers. It can also be used by any client or server application. The WebSocket Protocol is an independent TCP-based protocol that makes more interaction between a browser and a web site possible, facilitating live content and the creation of real-time games. This is made possible by providing a standardized way for the server to send content to the browser without being solicited by the client, and allowing for messages to be passed back and forth while keeping the connection open. In this way a two-way (bi-directional) ongoing conversation can take place between a browser and the server. Although in one embodiment, the websocket may facilitate communications between the development application 325 and the localization module 460, other devices and/or software code or communications mechanisms may be used that provide equivalent operations and functions as the websocket described herein.

Figure 6:
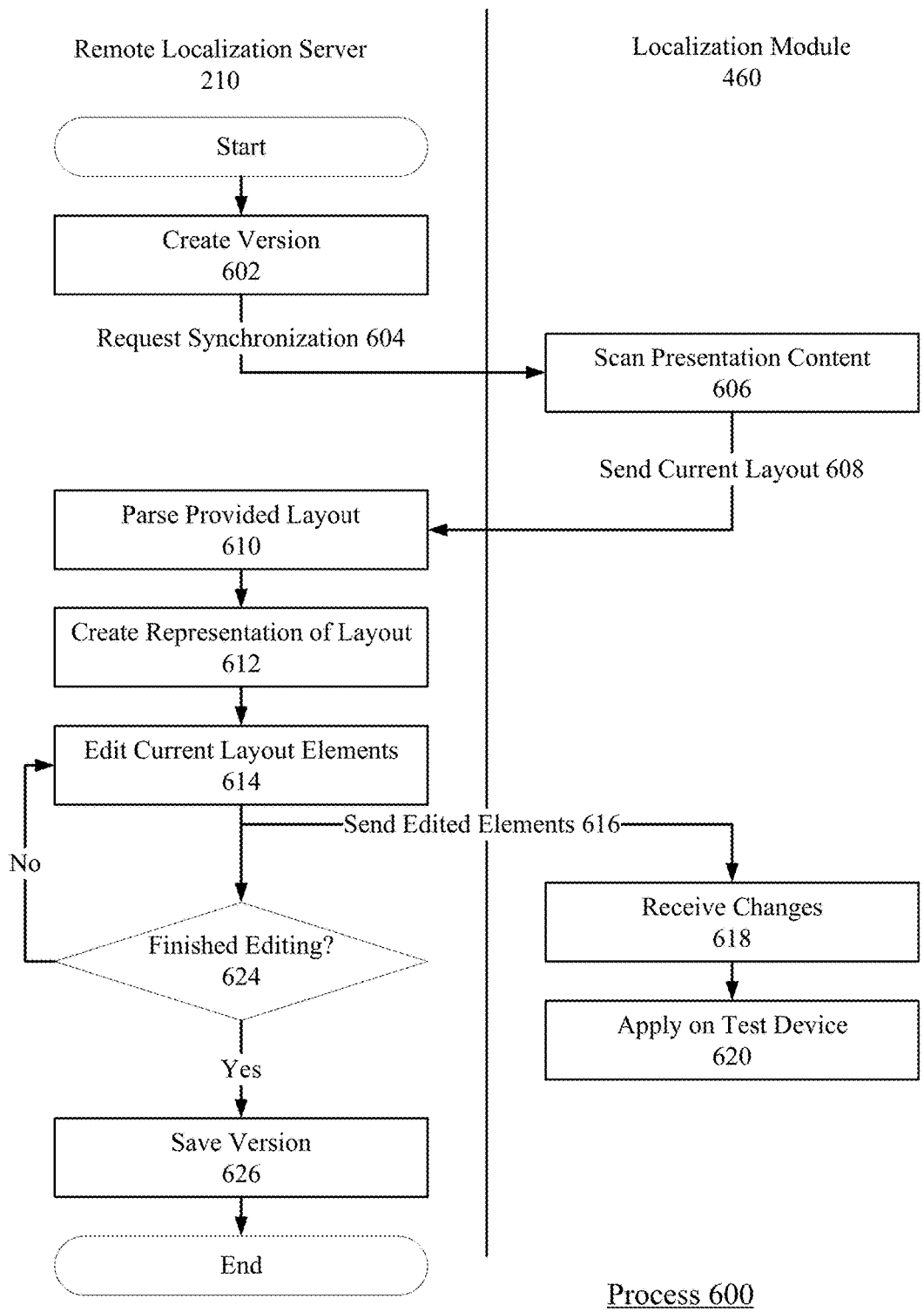
FIG. 6 is a flow chart depicting an example process for localizing an app.
Figure 7:
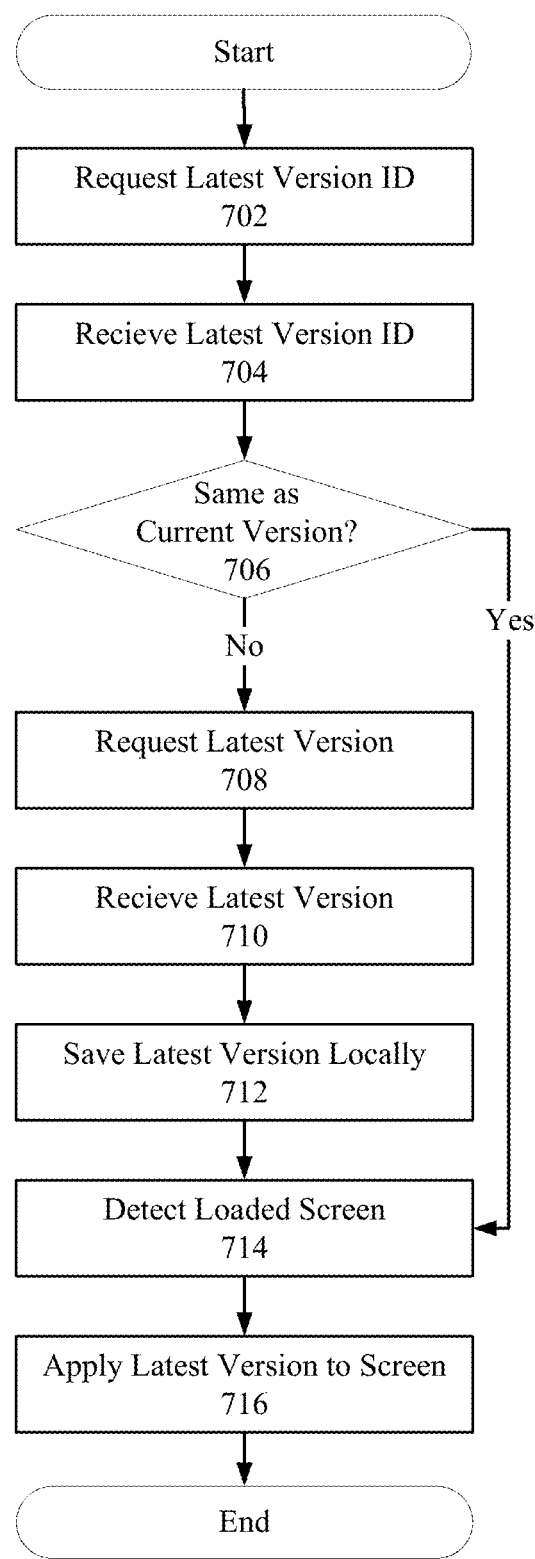
FIG. 7 is a flow chart depicting an example process for updating a localized application.

System 500B is an example embodiment of a version-based update scenario in which localization module 460 is instead communicating with version service module 315 to receive a completed version, in this case a bundle of changes, to apply. In some embodiments, applying a new version involves updating every element of the app stored on the test device 205 based on the localized content version and differences between the prior localized content version. In some embodiments, this update occurs when version service module 315 pushes the version to the associated user device 205. In other embodiments, localization module 460 may schedule periodic times to check for updates, or updates may be handled in any other suitable manner, including by manual user election. To illustrate these concepts, FIG. 6 is an example flowchart of a live update and FIG. 7 is an example flowchart of a version-based update. However, many other update methods for an application are possible under the current disclosure, and the two examples presented here should not be considered limiting to the scope of the disclosure.

FIG. 6 is a flow chart depicting an example process for localizing an app. In the illustrated embodiment, process 600 begins at step 602 when a version of the app is created in the development application. The remote localization server 210 synchronized this new version of the app with a connected user device 205 in step 604. In this configuration, steps 602 and 604 occur on the administration module 312 within the developer application 325. At step 606, developer module 462 of localization module 460 operating on the connected user device 205 scans the presentation content of the application and identifies presentation elements of the application. In this step, relevant content elements of the app are identified by localization module 460 and, in step 608, information about these presentation content elements are transmitted back to the remote localization server. In one embodiment, relevant content elements may comprise only those content elements visible on the current screen of user device 205, but in other configurations relevant content elements can also include any content element contained in app 410, or any suitable set of content elements included in app 410.

In the embodiment of FIG. 6, control flow is then passed back to the remote localization server in step 610 where the provided layout is then parsed into an appropriate format to allow visual representation of the current layout to be created on remote localization server 210. The visual content representation is synchronized to match the displayed content at the remote localization server 210 with the display of the app running on the device used with development of the localized version. In this embodiment, the synchronization is accomplished using localization module 460 as discussed above. For example, the visual representation may be constructed using the properties of the content elements to recreate their relative position and appearance as if viewed on user device 205. In some embodiments, the recreation may use any other provided information to recreate any missing contextual graphics or information. At step 614 the developer 230 may make changes to the localizable presentation content as represented in remote localization server 210 through a developer interface provided by developer interface module 311. For example, if the provided layout content included content elements, the developer may update properties of the provided content elements, for instance changing a text string associated with a content element to a string in another language, or changing the font size, color, or position of the element.

The control flow then branches based on whether there is a device providing a developer sub-module 460. When a developer sub-module is synchronized with the modifications being made at the remote localization server 210, the modifications made at the remote localization server 210 may be provided on that device as each modification is made. Thus, the first branch of the control flow passes back to the localization module side thus the developer's changes to localizable presentation content are received at the application 410 (step 618) and applied on the test device in real time (step 620). Edits to content elements may be represented by transferring the element containing the edited properties, transmitting only the edited properties, or by any other suitable method. When the user sub-module 464 is used, the modifications of step 618-620 may not be displayed to the user, in which case the user sub-module may not implement a localized content version until the version is committed at the remote localization server.

In this implementation, the second branch of the control flow occurs on remote localization server 210 when server 210 determines if there will be continued edits (step 624). In this implementation of a live update workflow, as the developer 230 edits application content, the changes made are continuously sent to localization module 460 where they are applied immediately to application 410 and the app as viewed on user device 205 is constantly updated in synch with the edits occurring on remote localization server 210. In this implementation, once there are no more edits, the new version of the app is saved (step 626). In this embodiment, saving the version of an app entails bundling the edits made in step 614 with any other edits associated with the localized content version. In some embodiments, the saved version can then be pushed to specified user devices 205 in any suitable manner.

FIG. 7 is a flow chart depicting an example process for updating an application with localized content. In the illustrated embodiment, process 700 begins at step 702. This process may be performed, for example by the user sub-module 464. At this step, localization module 460 sends a version check requesting the ID of the latest version to the remote localization server 210. At step 704, the localization module receives an identification of the current updated version of the app, based on any user identification data or identifying information related to the version. At step 706 localization module 460 checks if the current version of app 410 on the user device matches the latest version. If the current version of the app is running on the user device 205, control flows to step 714 where localization module 460 detects the currently loaded page or screen of the app. If screens are not defined within the app, localization module 460 may detect which elements are present within the current view of the user device display. Based on the elements that are displayed as indicated by the application logic module 472, the localization module 460 displays elements for the user presentation module 474 based on the localized content.

At step 706, if the current version of the app is not determined to be running on the user's device, control flows to step 708 where app localization module 460 requests the latest version from remote localization server 210. At step 710 the version service module has sent the new version, which is then received by localization module 460. At step 712, the new version is saved locally within app 410 and control flows to operation to step 714 where the new version is loaded. From this point the process proceeds from step 714 as described above. This completes process 700 according to one example embodiment.

In some configurations sending ("pushing") a new version, or otherwise updated content to the application may depend on the type of application. When the updated/new content, which may be in the form of JSON code, is received at localization module 460, how the changes are implemented may depend on how the app 410 is configured. In some embodiments, the original app developer includes a localization markup for the presentation content; creating a localization file within the app. In this configuration localization module 460 may use general app permissions and modify this localization file to reflect the localized content. In other configurations, the updated content may be pushed directly to device memory, overwriting any previous versions of the presentation content for that particular app. However, the original presentation content may be maintained within remote localization server 210, and may be pushed back to the user device if necessary. Certain embodiments may handle updated media files differently than other localized content, sending any updated/new media files to the assets folder of the user device 205.

In certain configurations, updates to presentation content may be applied immediately responsive to a new version being pushed from remote localization server 210. In some embodiments, updates to presentation content are made in real time. The relevant changes to presentation content may be encapsulated in the communication of the new version from remote localization server 210 to localization module 460, and can then be applied in the manner outlined above. In some implementations, updating presentation content as outlined will consequently cause app 410 to change display to reflect the new presentation content, even if app 410 was already displaying the pre-update version content. In certain embodiments, including embodiments where localized content is stored alongside original presentation content, localization module 460 may track user activity within the app and render updated content as appropriate. For example, when the user navigates to a new screen of the app localization module 460 may check any included localization files to determine if any updated presentation content for that screen exists.

Developer Interface

In some implementations, developers 230 can interact with remote localization server 210 for the purposes of localizing, translating, or otherwise modifying content and to manage the distribution of content updates to various user devices 205. In some configuration such interaction may take place via a development interface as provided by developer interface module 311.

Figure 8:
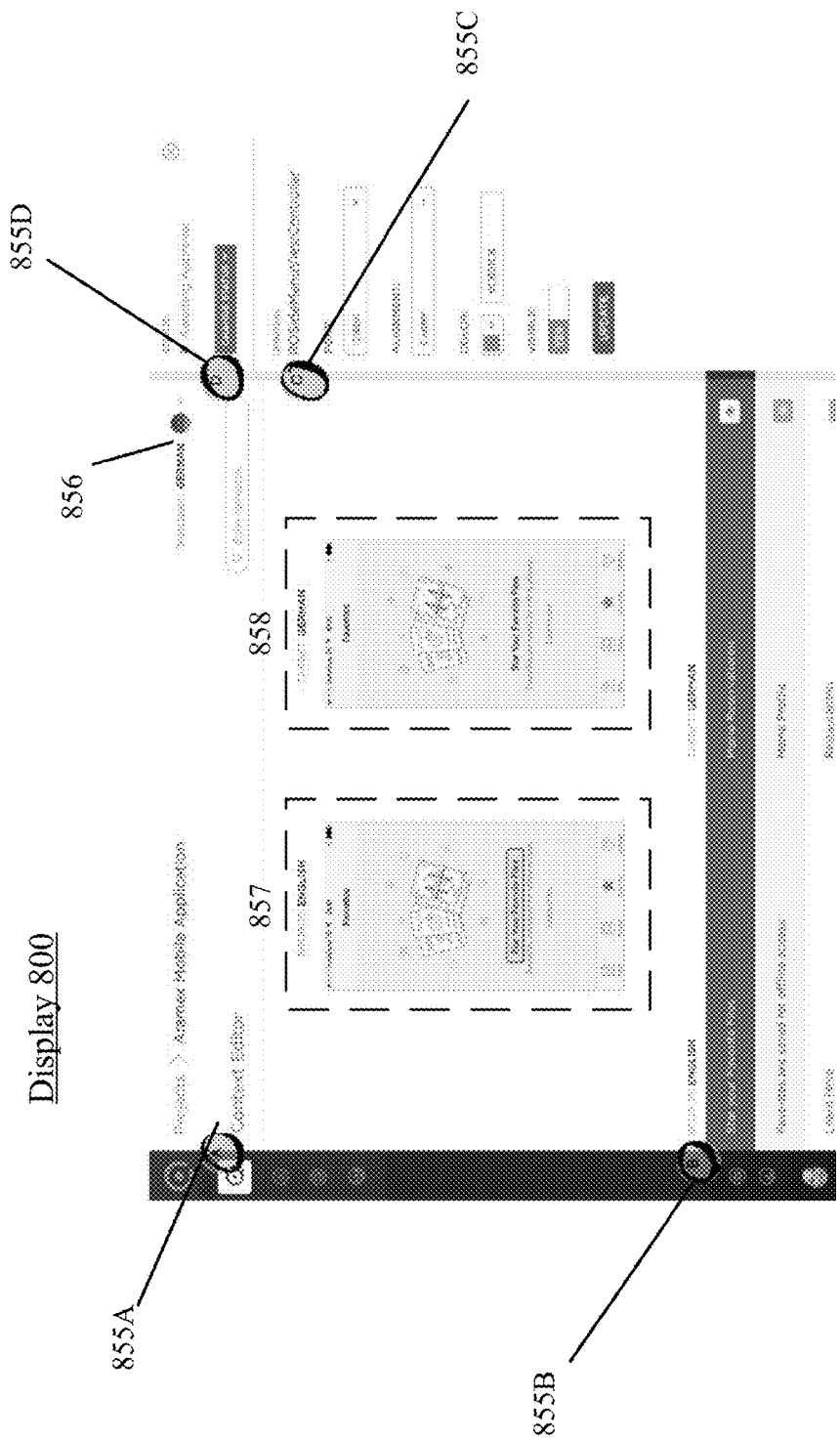
FIG. 8 depicts a display of an example context editor development interface of the development application of the system.

Referring now to FIG. 8, which depicts a display of an example context editor developer interface of the development application 325 of the system. In some configurations this developer interface is provided by developer interface module 311. In the illustrated embodiment, context editor display 800 includes a context editor selection icon 855A, a text editor selection icon 855B, a properties editor selection icon 855C, and a status update selection icon 855D. Display 800 further includes a version selection icon 856 as well as screen representations 857 and 858 showing representations of the original and updated content, in this embodiment a translation, being shown or edited respectively. Target language selection icon 856 can be used by developers 230 to select a target language for translating the presentation content into, e.g. German in the illustration of display 800 in some embodiments, each target language/locality is stored as a separate version or content version in the remote localization system. 855D, according to one embodiment, displays the release status of the current screen or element. In some configurations, information such as that provided in 856 and 855D enables remote localization server 210 to utilize the targeting mechanisms as described earlier to selectively push these versions to appropriate user devices 205. The display box 857 displays the current translation of the source language of the content being edited and the display box 858 displays the translation of the target language of the content being edited.

In configurations where localization module 460 communicates editable content to remote localization server 210, the content or content elements of the app to be edited by the system can be represented visually in a developer interface. In some embodiments, context editor 800 enables developers 230 to view the app representations of original and localized content side by side. In this way, the developers 230 are able to make edits in the context editor "in context," i.e., as if the developer is visually editing the app display directly, instead of editing in a programming language, and these changes can be converted to code and sent to the localization module 460 installed on the end user devices 205. Context editor functionality can be invoked by developers 230 in display 800 using the context editor selection icon 855A. In one embodiment, context editing is done using JSON to convert the native presentation content to HTML for display to a developer in the representation.

In some configurations, any text that is in the editable elements of the app can be identified by the localization module 460, communicated to the development application 325, and then displayed in in a developer interface in the same manner that they are presented in the application on the user device. For example, the original text can be displayed with the new updated text parallel, similar to how context editor 800 displays an original screen representation alongside an updated screen representation. The aligned text editor allows the developer to see how the new updated text will fit in the allotted space. In some configurations, the text editor also allows anyone with access to the system registration information to review updates before they are provided to the end user devices 205. The text editor functionality can be invoked by developers 230 in display 800 using the text editor selection icon 855B.

In some embodiments, each content element of the app is associated with a number of properties that can be edited from the remote localization server 210 discussed previously. In the embodiment of FIG. 8, certain properties are shown in display 800 including element name, font, color, alignment, and other display options (visible or not). In the embodiment of FIG. 8, properties editor functionality can be invoked by developers 230 in display 800 using the properties editor selection icon 855C to modify properties of the various elements of the application presentation.

The visual changes made in a developer interface may be converted to code or, in some embodiments, stored as edits to the properties of certain content elements. For example, when a developer 230 chooses to change the font of the selected element in FIG. 8 through the provided developer interface using properties editor 855C, remote localization server 210 may undertake the following steps. As the developer is editing the font selection, information about the change to the font is shown to the developer in the developer interface. In addition, information about this change is also communicated to development application 325, in one embodiment via a JavaScript (e.g., Ajax call) for storage. Administration module 312 may then update the property (e.g. font=Calibri) for the edited element. In this way, the developer is shown the revision and it may be converted to code for modifying the application itself. As described previously, this property of the edited element may be pushed to a user device 205, either continuously or as part of a grouped version.

Figure 9:
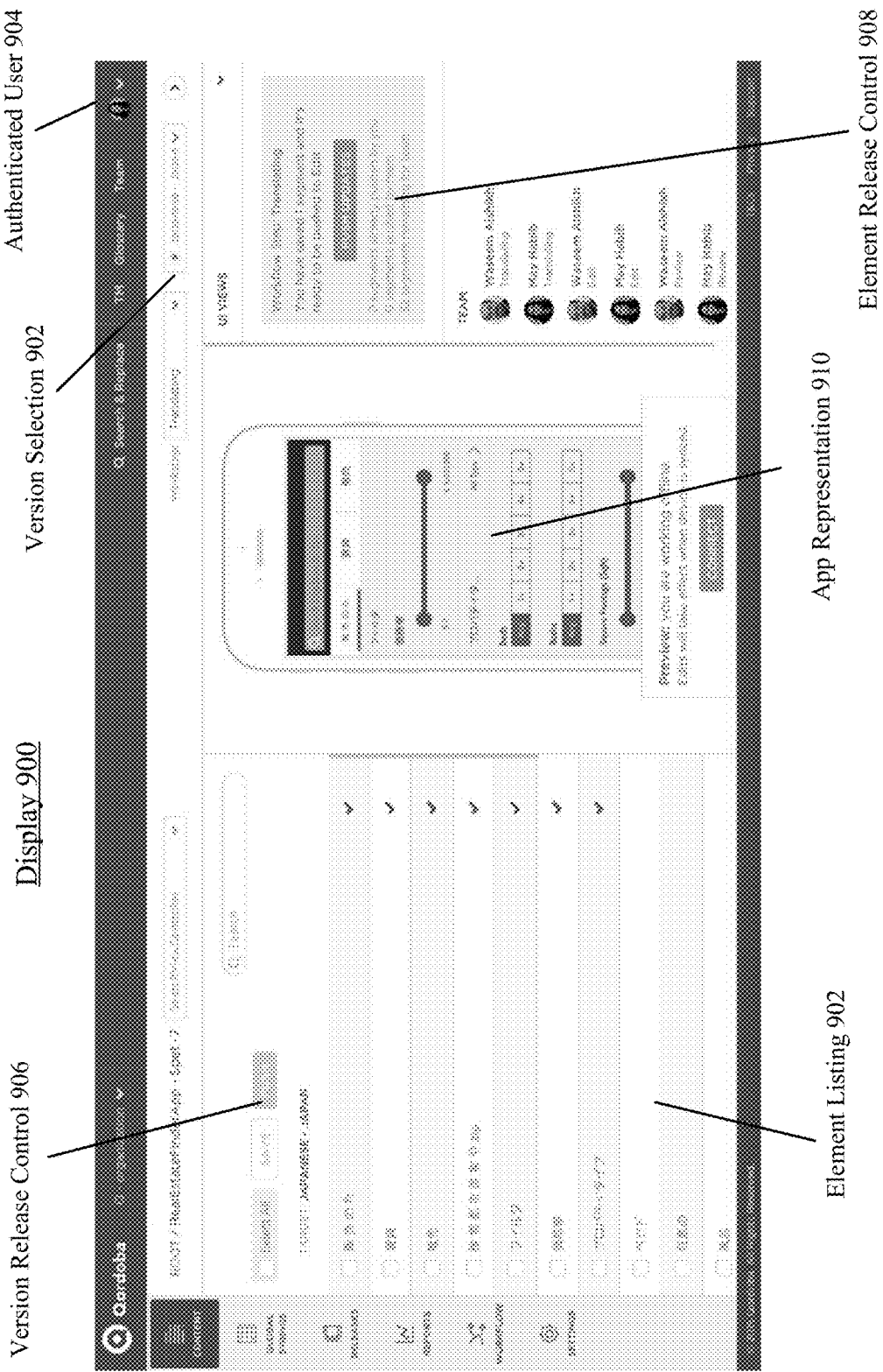
FIG. 9 depicts a display of an example presentation content editing development interface of a development application.

As described above, the techniques described herein provide developers 230 an interface for making visual edits to their apps, in some implementations for the purpose of remote localization without reprogramming. FIG. 9 depicts a display of an example presentation content editing development interface of a development application. In the illustrated embodiment, display 900 includes a version selection 902, an authenticated user 904, version and element release controls 906 and 908, an element listing 902, and an app representation 910. App representation 910, in the embodiment of FIG. 9, is a representation of one screen of app 410 recreated on development application 325. In this embodiment, developers 230 may view and make edits to content elements of app 410 as described above. Similarly, element listing 902 may display elements of the selected screen in a list format. Version release control 906 and element release control 908 may control pushing entire versions or individual elements to selected user devices 205.

Figure 10:
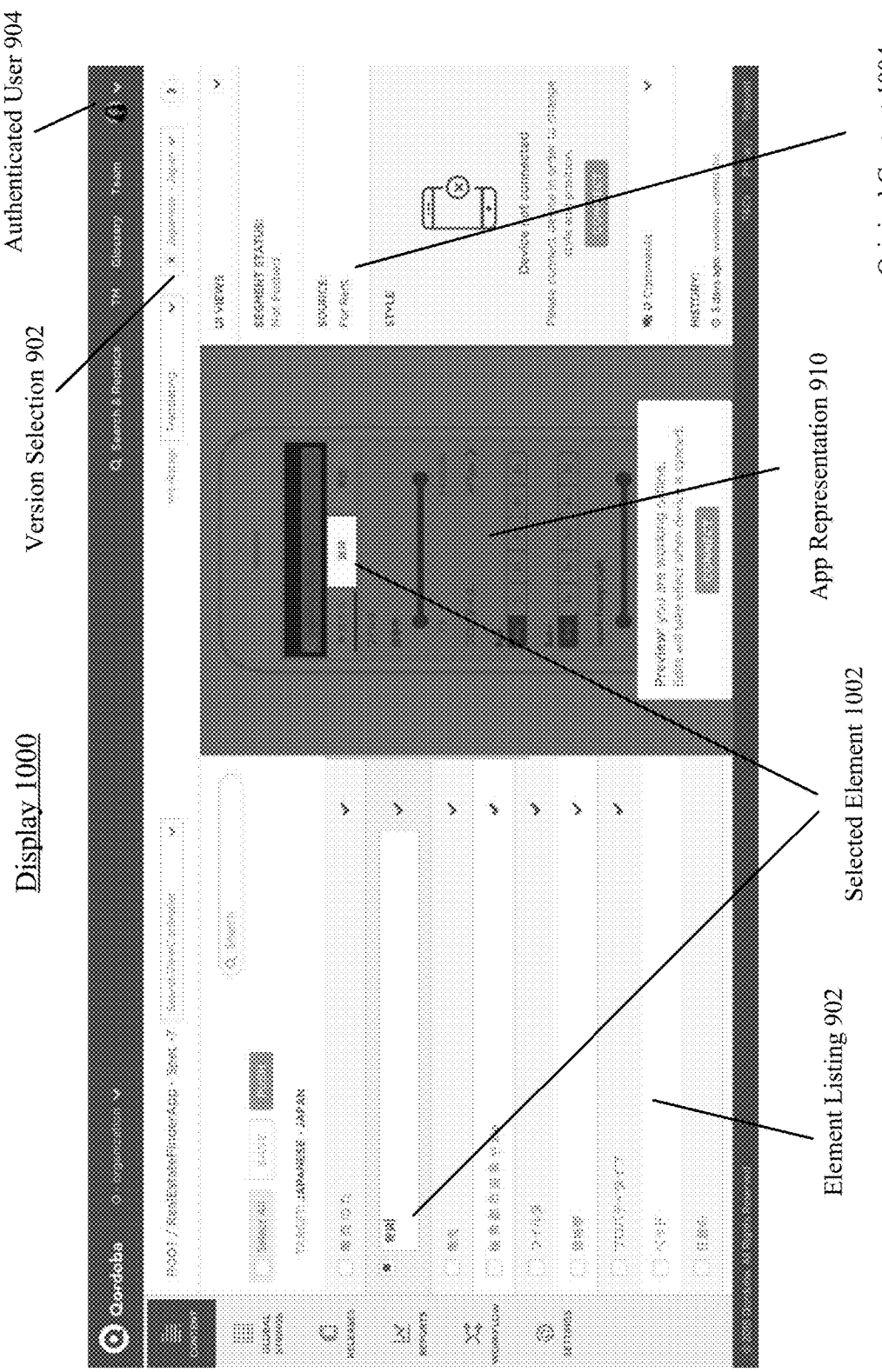
FIG. 10 depicts a second display of an example presentation content editing development interface of the development application.

Similar to FIG. 9, FIG. 10 depicts a second display of an example presentation content editing development interface of the development application. Display 1000 includes similar features previously outlined in FIG. 9, but with a specific content element selected. In the embodiment of FIG. 10, selected element 1002 is displayed as highlighted in both element listing 902 and app representation 910, and can be edited from either, but in other embodiments it may only be highlighted in either element listing 902 or app representation 910. Additionally, an element's original content 1004 showing the un-translated version of the original content of selected element 1002, according to the embodiment of FIG. 10.

Figure 11:
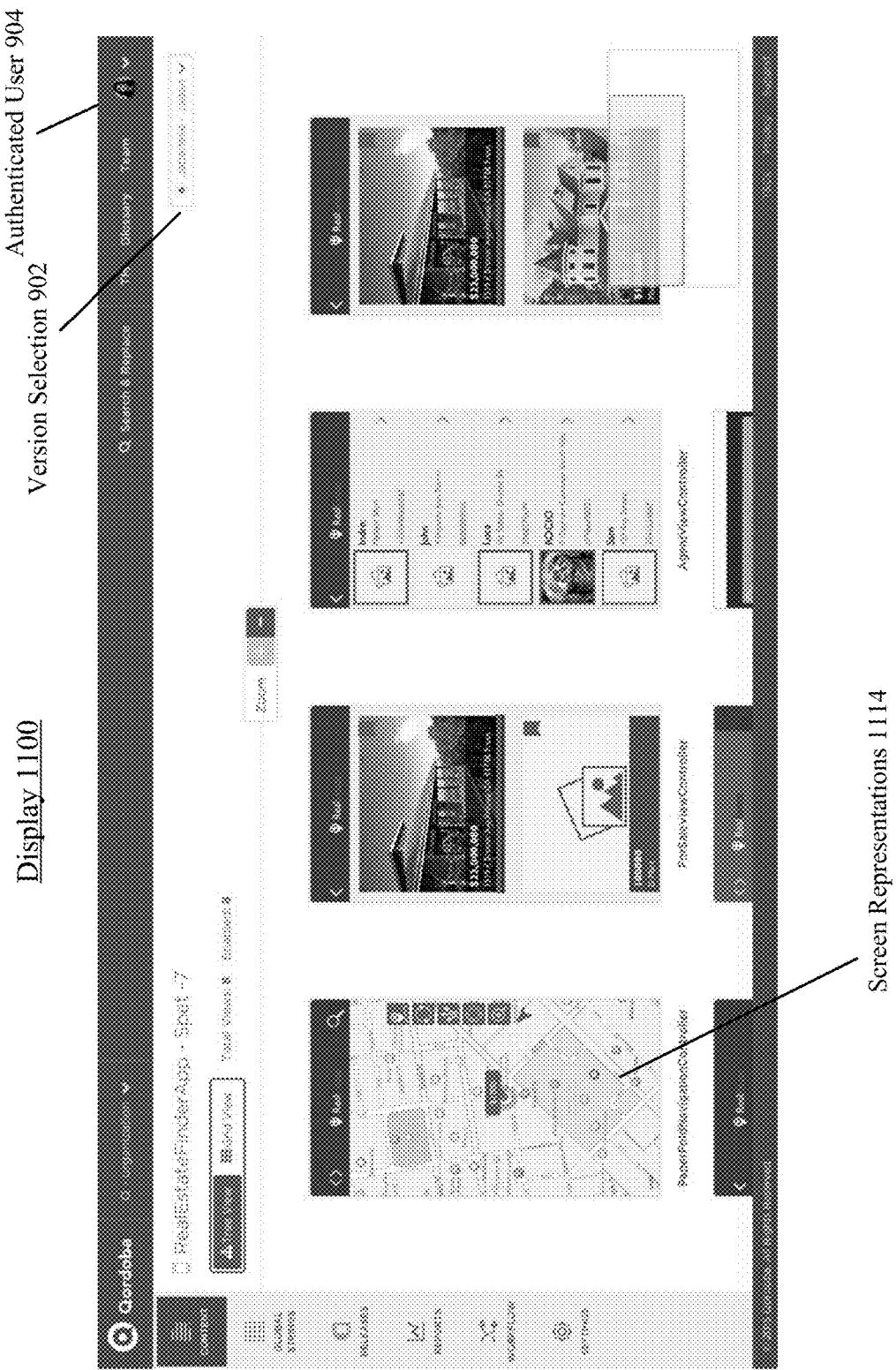
FIG. 11 depicts a display of an example screen selection development interface of the development application.

FIG. 11 depicts a display of an example screen selection development interface of the development application. In some implementations, a developer interface is configured to allow developer 230 to select between different screens of the application to edit. In the embodiment of FIG. 11, screen representations 1114 are presented to allow developers 230 to select different screens to edit. In other embodiments, display 1100 may be additionally configured to display links between screens as described above. These links may indicate possible navigation from one screen to another, of a conceptual relationship between screens, or of any other suitable relationship between screens.

In some embodiments, a developer interface may further show a number of interface controls that can be utilized by developers such as a live edit selection icon, an undo/redo selection icon, a language selection icon, an icon for pushing changes to a user, or a drop down menu with a list of glossary terms for access by the developers, or to perform any other suitable function.

Example Implementations

Embodiments of the present invention may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Figure 12:
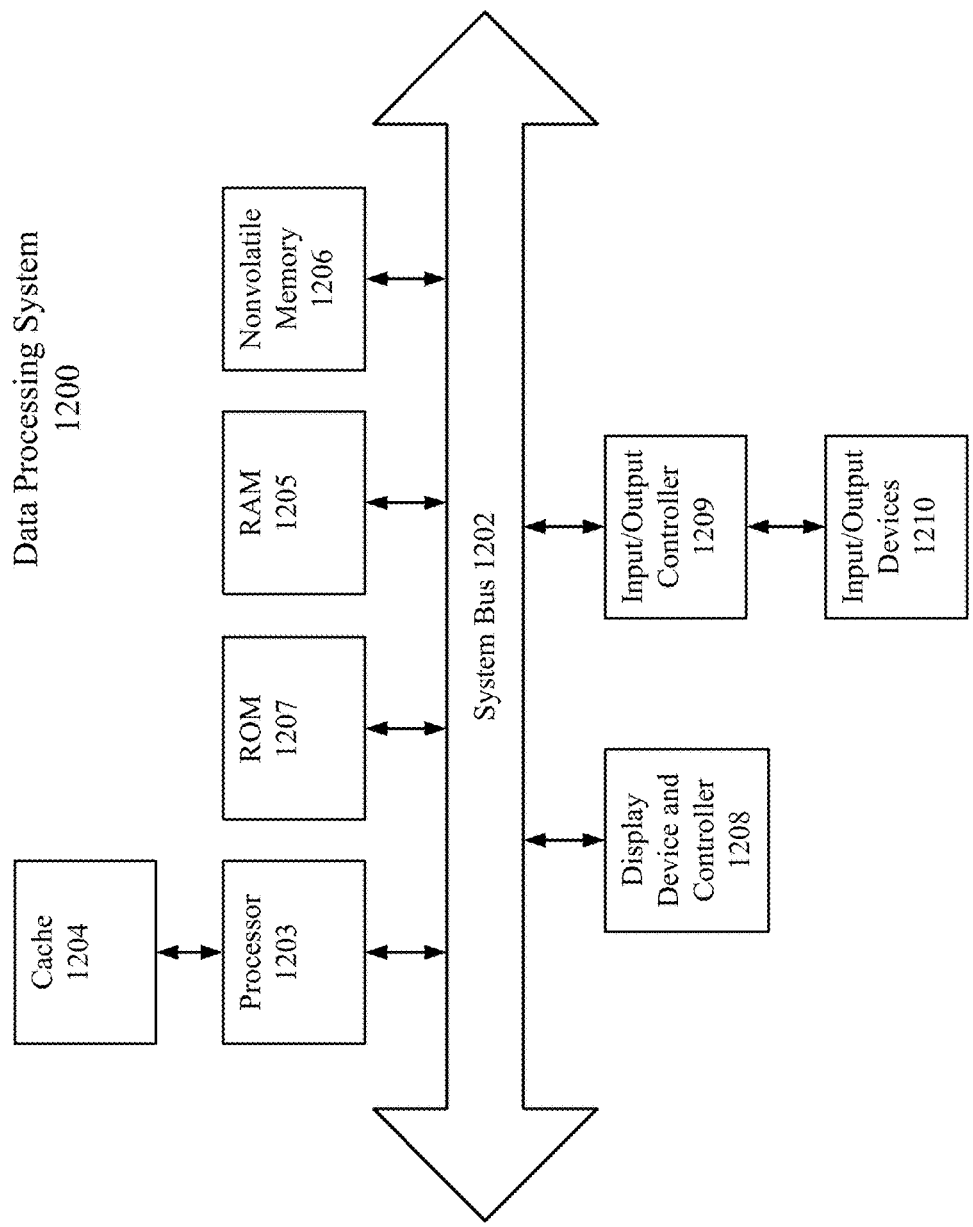
FIG. 12 depicts an example data processing system on which the embodiments described herein may be implemented.

FIG. 12 depicts one example of a typical data processing system, such as data processing system 1200, which may be used to implement the described embodiments. Note that while FIG. 12 illustrates various components of a data processing system, it is not intended to represent any particular architecture or manner of interconnecting the components as such details are not germane to the techniques described herein. It will also be appreciated that network computers and other data processing systems, which have fewer components or perhaps more components, may also be used. The data processing system of FIG. 12 may, for example, a personal computer (PC), workstation, tablet, smartphone or other hand-held wireless device, or any device having similar functionality.

As shown in FIG. 12, the data processing system 1201 includes a system bus 1202, which is coupled to a processor 1203, a Read-Only Memory ("ROM") 1207, a Random Access Memory ("RAM") 1205, as well as other nonvolatile memory 1206, e.g., a hard drive. In the illustrated embodiment, processor 1203 is coupled to a cache memory 1204. System bus 1202 can be adapted to interconnect these various components together and also interconnect components 1203, 1207, 1205, and 1206 to a display controller and display device 1208, and to peripheral devices such as input/output ("I/O") devices 1210. Types of I/O devices can include keyboards, modems, network interfaces, printers, scanners, video cameras, or other devices well known in the art. Typically, I/O devices 1210 are coupled to the system bus 1202 through I/O controllers 1209. In one embodiment the I/O controller 1209 includes a Universal Serial Bus ("USB") adapter for controlling USB peripherals or other type of bus adapter.

RAM 1205 can be implemented as dynamic RAM ("DRAM"), which requires power continually in order to refresh or maintain the data in the memory. The other nonvolatile memory 1206 can be a magnetic hard drive, magnetic optical drive, optical drive, DVD RAM, or other type of memory system that maintains data after power is removed from the system. While FIG. 12 shows that nonvolatile memory 1206 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments could employ various computer-implemented functions involving data stored in a computer system. The techniques may be carried out in a computer system or other data processing system in response executing sequences of instructions stored in memory. In various embodiments, hardwired circuitry may be used independently or in combination with software instructions to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be implemented in computer-readable instructions stored on an article of manufacture referred to as a computer-readable medium, which is adapted to store data that can thereafter be read and processed by a computer. Computer-readable media is adapted to store these computer instructions, which when executed by a computer or other data processing system such as data processing system 1200, are adapted to cause the system to perform operations according to the techniques described herein. Computer-readable media can include any mechanism that stores information in a form accessible by a data processing device such as a computer, network device, tablet, smartphone, or any device having similar functionality.

Examples of computer-readable media include any type of tangible article of manufacture capable of storing information thereon including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing instructions in an electronic format. Computer-readable media can also be distributed over a network-coupled computer system stored and executed in a distributed fashion.

It should be understood that the various data processing devices and systems are provided for illustrative purposes only, and are not intended to represent any particular architecture or manner of interconnecting components, as such details are not germane to the techniques described herein. It will be appreciated that network computers and other data processing systems, which have fewer components or perhaps more components, may also be used. For instance, these embodiments may be practiced with a wide range of computer system configurations including any device that can interact with the Internet via a web browser or an application such as hand-held devices, microprocessor systems, workstations, personal computers ("PCs"), Macintosh computers, programmable consumer electronics, minicomputers, mainframe computers, or any mobile communications device including an iPhone, iPad, Android, or Blackberry device, or any device having similar functionality. These embodiments can also be practiced in distributed computing environments where tasks are performed by remote processing devices that are linked through a wire-based or wireless network.

What is claimed is:

1. A method comprising:
  receiving, at a remote localization server from a transmitting user device executing an application, information describing one or more properties of each of a plurality of content elements presented on a display of the transmitting user device by the application;
  generating, at the remote localization server, a visual representation of the display of the transmitting user device by:
    generating, at the remote localization server, a plurality of visual content element representations, each visual content element representation recreating the appearance of a content element of the plurality of content elements on the display of the user device based on the one or more properties of the content element; and
    constructing the visual representation of the display comprising the plurality of visual content element representations by positioning each visual content element representation to recreate the position and appearance of the corresponding content element as presented on the display of the user device;

receiving, from a developer device associated with a developer, an edit including one or more updated properties for a first content element of the plurality of content elements based on the visual representation of the display of the transmitting user device, the updated properties specifying a modification to one or more of the properties of the first content element;

updating, at the remote localization server based on the one or more updated properties of the received edit, a first visual content element representation of the plurality of visual content element representations in the visual representation of the display, the first visual content element representation generated based on one or more properties of the first content element; and after updating the first visual content element representation, transmitting the edit including the one or more updated properties to a receiving user device for modification of the display of the application executing on the receiving user device.

2. The method of claim 1 wherein the receiving user device is the transmitting user device.

3. The method of claim 1 further comprising:
transmitting the one or more updated properties to a plurality of receiving user devices, the plurality of receiving user devices executing the application.

4. The method of claim 1 wherein generating the visual representation of the display comprises simulating the display of the transmitting user device by the application.

5. The method of claim 1 wherein one or more content elements of the plurality of content elements further comprise an interactive element, animation, or user interaction.

6. The method of claim 1 wherein the edit comprises translating the first content element into a different language.

7. The method of claim 1 wherein the edit comprises localizing the first content element for a specific locality.

8. The method of claim 1 wherein the one or more properties of a content element comprise color information, positional information, and font information.

9. The method of claim 1 wherein a content element comprises a string, text, an image or graphic, or a user interface element.

10. The method of claim 1 wherein the plurality of content elements are concurrently viewable on the display of the transmitting user device.

11. The method of claim 1 wherein the plurality of content elements comprises all the content elements of the application.

12. The method of claim 1 wherein generating the visual representation of the display of the transmitting user device comprises generating a visual content element representation for each content element of the plurality of content elements.

13. The method of claim 12 wherein generating the visual representation of the display of the transmitting user device comprises simulating a display of the application on which each content element of the plurality of content elements is present and viewable.

14. A method comprising:
receiving, at a remote localization server from a transmitting software development kit (SDK) embedded within a transmitting user device executing an application, information describing one or more properties of each of a plurality of content elements presented on a display of the transmitting user device by the application;

generating, at the remote localization server, a visual representation of the display of the transmitting user device by:
generating, at the remote localization server, a plurality of visual content element representations, each visual content element representation recreating the appearance of a content element of the plurality of content elements on the display of the user device based on the one or more properties of the content element; and constructing the visual representation of the display comprising the plurality of visual content element representations by positioning each visual content element representation to recreate the position and appearance of the corresponding content element as presented on the display of the user device;

receiving, from a developer device associated with a developer, an edit including one or more updated properties for a first content element of the plurality of content elements based on the visual representation of the display of the transmitting user device, the updated properties specifying a modification to one or more of the properties of the first content element;

updating, at the remote localization server based on the one or more updated properties of the received edit, a first visual content element representation of the plurality of visual content element representations in the visual representation of the display, the first visual content element representation generated based on one or more properties of the first content element; and after updating the first visual content element representation, transmitting the edit including the one or more updated properties to a receiving SDK, the receiving SDK configured to modify the application.

15. The method of claim 14 wherein the receiving SDK is configured to modify the application immediately upon receiving transmitted information about an edit to the application.

16. The method of claim 14 wherein transmitting information about the edit to a receiving SDK further comprises:
transmitting the one or more updated properties to a plurality of receiving SDKs, each SDK of the plurality of receiving SDKs each configured to modify an associated application of a plurality of applications.

17. The method of claim 16 wherein each receiving SDK of the plurality of receiving SDKs is configured to modify the associated application of the plurality of applications in real-time on a user device associated with the receiving SDK.

18. The method of claim 16 wherein the plurality of applications are a subset of a larger plurality of applications selected based on user characteristics of a user of each application.

19. The method of claim 16 wherein each application of the plurality of applications is associated with a user device and wherein the plurality of applications is selected based on a location of the associated user devices, a language setting of the associated user devices, an IP address of the associated user devices, a preference setting of the application, or any combination thereof.

* * * * *